United States Patent
Kanamaru et al.

[11] Patent Number: 6,041,392
[45] Date of Patent: Mar. 21, 2000

[54] DISK DRIVE DEVICE AND METHOD FOR CONTROLLING THE SAME

[75] Inventors: Atsushi Kanamaru, Sagamihara; Toshio Kakihara, Fujisawa; Yuhji Kigami, Yamato; Takahiro Saitoh, Yokohama, all of Japan

[73] Assignee: International Business Machines Corporation, Armonk, N.Y.

[21] Appl. No.: 09/049,680

[22] Filed: Mar. 27, 1998

[30] Foreign Application Priority Data

Mar. 27, 1997 [JP] Japan .................................. 9-074949

[51] Int. Cl.[7] ...................................................... G06F 12/08
[52] U.S. Cl. ............................ 711/113; 710/130; 710/34; 710/26; 711/137; 711/118
[58] Field of Search .................................... 711/113, 169, 711/4, 218, 137, 117, 118, 156, 168; 710/23, 24, 130, 34, 35, 22, 26

[56] References Cited

U.S. PATENT DOCUMENTS 5,696,931  12/1997  Lum et al. .............................. 711/113
5,727,232   3/1998  Iida et al. .................................. 710/56
5,778,420   7/1998  Shitara et al. .......................... 711/113

*Primary Examiner*—Hiep T Nguyen
*Attorney, Agent, or Firm*—Monica D. Lee; Randall J. Bluestone

[57] ABSTRACT

A disk drive and a method for controlling the disk drive in which an additional read from a medium can be performed as needed while minimizing the command overhead to the minimum. In a disk drive device 10, even if a read command is issued, and all the required data is stored in the cache memory such that the data transfer can be performed without the intervention of a local MPU 16, a HIC 15 performs the data transfer so as to leave the last one block and waits for the intervention of the local MPU 16. The local MPU 16 provides instructions to transfer the last one block when the preparation for the command termination is completed, and if a plurality of blocks of data to be transferred are remaining when the local MPU 16 instructs the HIC 15 to transfer the last one block, the HIC 15 executes all the data transfer without stopping the data transfer before the last one block, completing the command.

5 Claims, 3 Drawing Sheets

DISK DRIVE DEVICE AND METHOD FOR CONTROLLING THE SAME

BACKGROUND OF THE INVENTION

1. Field of the Invention

The present invention relates to a disk drive such as a hard disk drive (HDD) and a control method thereof, and more particularly, to a disk drive with a cache memory and a method for controlling the same.

2. Description of Related Art

Hard disk drives (HDD) are often used as an auxiliary storage for an information processing unit. Conventional HDDs often include a cache memory for temporarily storing the data supplied from the information processing unit (hereinafter referred to as host) or temporarily storing the data read from a magnetic disk until this data is transferred to the host, and a controller for performing the cache control.

When the controller receives data from the host, the controller temporarily stores the write data in the cache memory, and then releases the host from processing the write data. Concurrently, the controller controls further processing of the write data so that the write data retained in the cache memory is sequentially written into the magnetic disk (hereinafter referred to as medium). Furthermore, the controller performs the reading of data from the medium for which a read request is expected from the host, and temporarily stores that read data in the cache memory. Once a read request is issued from the host and the data to be read is retained in the cache memory, it is transferred to the host. Such cache control often increases the access speed of the HDD.

Recently, many low end HDDs attempt to increase the performance of the HDD by decreasing the command overhead. The command overhead is often decreased by reducing the intervention of the microprocessor of the HDD (hereinafter referred to as local MPU) while performing data processing around the host interface. Rather than having the local MPU perform such processing, a host interface controller (HIC) performs the data processing around the interface by hardware.

For many HDDs, the transfer of data between the host and the cache memory is controlled by the HIC without any intervention from the local MPU, while the transfer of data between the medium and the cache memory requires the intervention of the local MPU. If all the data required by a read command from the host is already retained in the cache memory (i.e., an "all-hit" situation), then all of the data can be transferred without the intervention of the local MPU. The following two techniques are often used in conventional HDDS.

(1) While the intervention of the local MPU is not required, performing all of the processing by hardware.

(2) No data transfer is performed by hardware such that the local MPU always intervenes.

Although these two techniques reduce the intervention from the local MPU as much as possible by increasing the processing by the HIC as much as possible, there is a limit to the increase in performance of the HDD.

For example, for the first technique, although the corresponding command itself can be processed at a very high speed because the processing is performed by hardware, the performance may be decreased in the following situation.

Supposed that the above described "all-hit" situation continues at very short command intervals. This case corresponds to a sequential read which may occur frequently. In this case, data can be transferred at high speed as long as all the requested data is stored in the cache memory. Because this technique does not allow any intervention from the local MPU, no additional data can be transferred from the medium to the cache memory. Accordingly, the data in the cache memory is exhausted after a while, and the required data must be read from the medium. This requires an extremely long time as compared with the command overhead time needed for data transfer, such as the turning of the medium, and thus the data transfer speed largely decreases.

On the other hand, if the second technique is used, the disadvantage described above can be avoided because the local MPU is allowed to intervene. However, the advantages provided by the hardware cannot be exploited.

SUMMARY OF THE INVENTION

It is the object of the present invention to provide a disk drive and a method for controlling the same in which an additional read from a medium can be performed as needed while minimizing the command overhead and increasing the overall performance of the disk drive.

A disk drive is described. The disk drive of the present invention includes a disk storage medium; a disk controller for controlling read and write operations; a cache memory for temporarily storing data additionally read from the disk storage medium; a host interface controller for transferring data between a host and the cache memory; and a microprocessor for controlling the overall operation of the disk drive including the data transfer between the disk storage medium and the cache memory. The host interface controller causes an additional read into the cache memory through the microprocessor at least once before completing the read command even if all the requested data is stored in the cache memory.

A method for controlling a disk drive device is also described. If a read command is issued, and all the required data is retained in the cache memory so that the transfer of data can be performed without the intervention of the microprocessor, the host interface controller transfers all of the blocks except the last predetermined number of blocks and notifies the microprocessor of the start of the data transfer. Instructions to transfer additional read data into the cache memory are provided by the microprocessor to the disk controller in response to the notification of the start of the data transfer. The host interface controller transfers the last predetermined number of blocks after the additional read control is terminated by the disk controller.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The disk drive of the present invention is well suited for low end HDDs that include an IDE (Integrated Device Electronics) interface.

Figure 1:
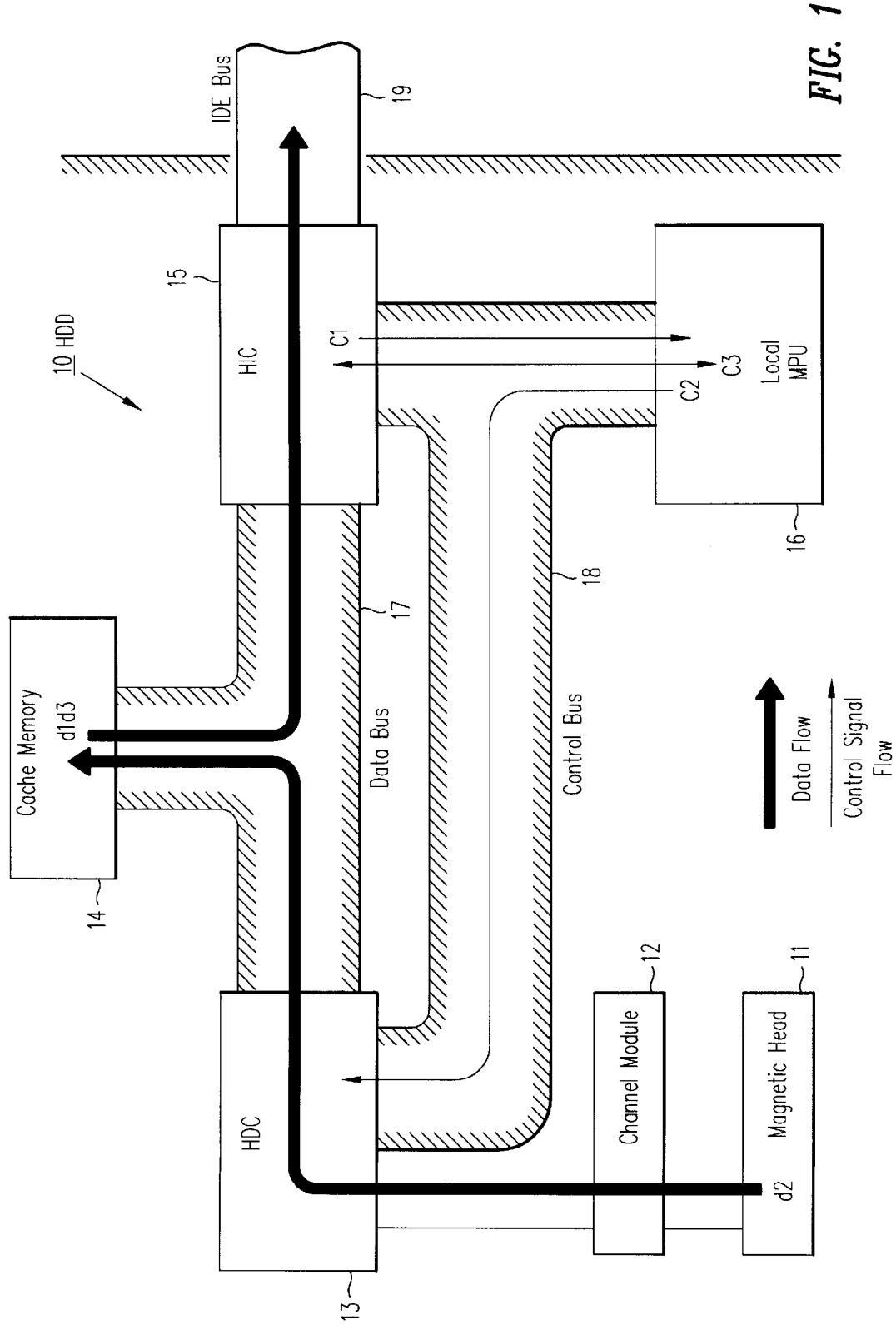
FIG. 1 illustrates a block diagram of a disk drive according to one embodiment of the present invention.

FIG. 1 is a block diagram illustrating a disk drive 10 according to one embodiment of the present invention. In FIG. 1, the thick solid arrows represent the data path, and the thin solid arrows represent the control path.

In FIG. 1, a magnetic disk unit (HDD) 10 includes a magnetic head 11 for reading data from and writing data to a magnetic disk (not shown); a channel module 12 which includes a circuit for amplifying a detected signal, a waveform shaping circuit, an analog-to-digital converter (ADC), and a digital-to-analog converter (DAC); a hard disk controller (HDC) 13 for controlling the reading of data from and the writing of data to the magnetic disk; a cache memory 14 for storing write data; a host interface controller (HIC) 15 for performing data the processing around the host interface by hardware, and a local MPU 16 for controlling the overall operation of HDD 10, including HDC 13 and HIC 15.

Furthermore, HDC 13, cache memory 14, and HIC 15 are coupled together by a data bus 17; HDC 13 and HIC 15 are each coupled to local MPU 16 by a control bus 18; and HIC 15 is coupled to a host external to HDD 10 by an IDE bus 19.

The cache memory 14 has a storage capacity of more than several hundreds of recording units (sectors) per magnetic disk, for instance, 128K bytes (256 blocks). For one embodiment, 1 block=1 sector=512 bytes. However, for a disk drive with an IDE interface, the host can specify a plurality of blocks on the cache memory as one block, for example, it can specify 1, 2, 4, 8, 16, or 32 sectors as one block.

The HIC 15 includes an internal memory having the capability of storing all the information necessary to transfer data. Additionally, HIC 15 transfers data between the host and cache memory 14 by hardware without any intervention from local MPU 16.

The internal memory of HIC 15 includes a cache table that contains information representing the correspondence between addresses on cache memory 14 and the magnetic disk, and the number of continuously stored blocks.

When the host issues a command, HIC 15 compares the address of the issued command with the cache table, and notifies local MPU 16 of the hit status of the one having the highest hit rate. The highest hit rate refers to the one that not only has the most hits but the one which satisfies another condition such as the beginning of a block is hitting. Thus, HIC 15 determines whether or not the required data exists in cache memory 14 when a read command is issued from the host and how many blocks to transfer without the intervention of local MPU 16.

More specifically, HIC 15 calculates how many blocks are required to be transferred in order to leave one block, and transfers the blocks based on the calculation if it determines that all the required data exists in the cache memory 14 when a read command is issued. Furthermore, when the read command is issued, HIC 15 sends to local MPU 16 the contents of the command, an indication that all the required data in cache memory 14, and a request to be notified of the completion of the preparation for data transfer.

The local MPU 16 is a microprocessor for executing a control program. The local MPU 16 has a memory for storing the control program and data. Additionally, local MPU 16 executes the control program to control the overall operation of HDD 10, which includes controlling the operation of HDC 13 and HIC 15 based on the command and control data supplied from HIC 15 and the host. In other words, local MPU 16 controls HIC 15 based on command information from the host and the hit information for the command from HIC 15.

Furthermore, local MPU 16 calculates additional reads from the medium as needed, and provides instructions on the additional reads to HDC 13. The HDC 13 performs the additional reads from the medium according to the instructions, and transfers the additional data read into cache memory 14. When writing data into cache memory 14 from the medium as described above, the cache table needs to be updated. The local MPU 16 calculates whether or not to perform an additional read into the cache by using an algorithm that takes the past access pattern of the host and the amount of data remaining in cache memory 14 into consideration.

As described above, HDD 10 has an IDE interface, and includes cache memory 14 coupled to the data bus 17, which is coupled to the medium. The HIC 15 transfers data between HIC 15 and cache memory 14 without the intervention from local MPU 16; but, the data transfer between the medium and cache memory 14 requires intervention from local MPU 16.

For HDDS with an IDE interface for a write command, HDD 10 controls the timing for terminating the write command after the termination of all data transfers. That is, HIC 15 may perform the data transfer to cache memory 14, and terminates the command at a time convenient for local MPU 16 after a space of, for instance, one or more blocks is made in cache memory 14 by a write the disk.

On the other hand, for a read command, the termination of the data transfer represents the termination of the command. In other words, all data transfers are performed by HIC 15. As a result, local MPU 16 may not be able to perform a processing operation such as an additional read for the cache. This corresponds to the case in which continuous read commands successively hit the cache, which may frequently occur in a sequential reading.

Accordingly, the present invention improves the above described disadvantage while minimizing the command overhead by allowing local MPU 16 to intervene at least once before completing a read command, while maximizing the data transfer without the intervention of local MPU 16. Specifically, even if a read command is issued and all the required data is stored in the cache so that the entire data transfer can be performed without the intervention of local MPU 16, HIC 15 stops the transfer leaving the last one block and waits for the intervention of local MPU 16. The local MPU 16 permits the transfer of the last one block when the preparation for the command termination is made.

Upon receipt of a command, the transfer is started, and simultaneously, local MPU 16 is informed of this. While local MPU 16 is taking a predetermined amount of time for the calculations of the additional read (e.g., calculation related to the additional read and calculation related to the cache table update), HIC 15 is transferring data. If the time taken by local MPU 16 for the calculations of the additional read is longer than the time taken to transfer the data, the transfer is paused by HIC 15, leaving the last one block. On the other hand, if the time taken by local MPU 16 for the calculations of the additional read and the like is shorter than the time taken for the data transfer, the transfer is not stopped.

The operation of HDD 10 is described in detail below. The thick solid arrows shown in FIG. 1 illustrate that data read from the medium is first transferred to cache memory 14 as shown by arrow d2, and are then transferred from cache memory 14 to the host through HIC 15 and IDE bus 19 as shown by arrow d1, provided there is no intervention from local MPU 16.

If there is an "all-hit" situation (i.e., a cache-hit case in which all the required data is stored in cache memory 14), HIC 15 immediately starts the data transfer without the intervention of local MPU 16. In addition, HIC 15 notifies local MPU 16 of the issuance of the read command and the all-hit status, and continues the transfer until the last block is left.

Upon receipt of this notification, local MPU 16 performs the processing required to start an additional read from the medium as needed. For instance, the processing includes recalculating how long the read to HDC 13 should be extended by an additional command issued, and reflects the result in the cache table. When the processing for starting the additional read from medium by local MPU 16 is terminated, it notifies HIC 15 of the termination of the control of the additional read. This notification indicates that the preparation for the command termination has been made, and allows HIC 15 to transfer the last block.

In order to control the additional read operation, it is only required that the control of additional read has been issued. The actual performance of the additional read is not required. Depending on the data transfer status of HIC 15 when HIC 15 is allowed to transfer the last block by local MPU 16, there are the following two cases.

Case 1: At the above point of time, HIC 15 has already terminated the data transfer except the last block, and HIC 15 has stopped the transfer, leaving the last block. In this case, HIC 15 restarts the transfer of the last block and terminates the command.

Case 2: In the second situation, data of one or more blocks is remaining in HIC 15 when HIC 15 is allowed to transfer the last block. In other words, HIC 15 is still transferring data. In this case, HIC 15 continuously executes the transfer to the end without leaving the last block, completing the command.

The above operation is described in detail with reference to the flowcharts shown in FIGS. 2 and 3.

Figure 2:
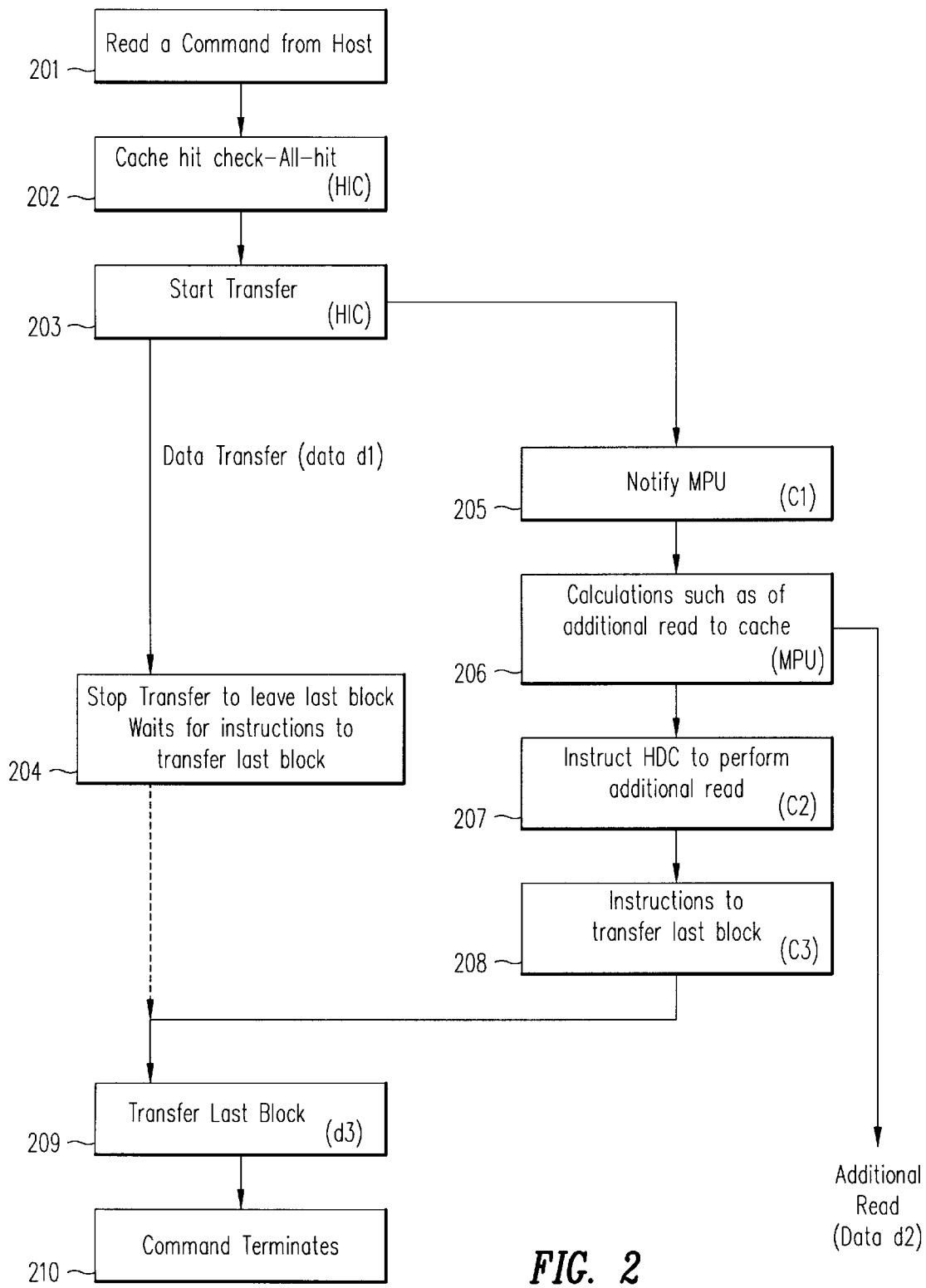
FIG. 2 is a timing flowchart illustrating the operation of the disk drive.
Figure 3:
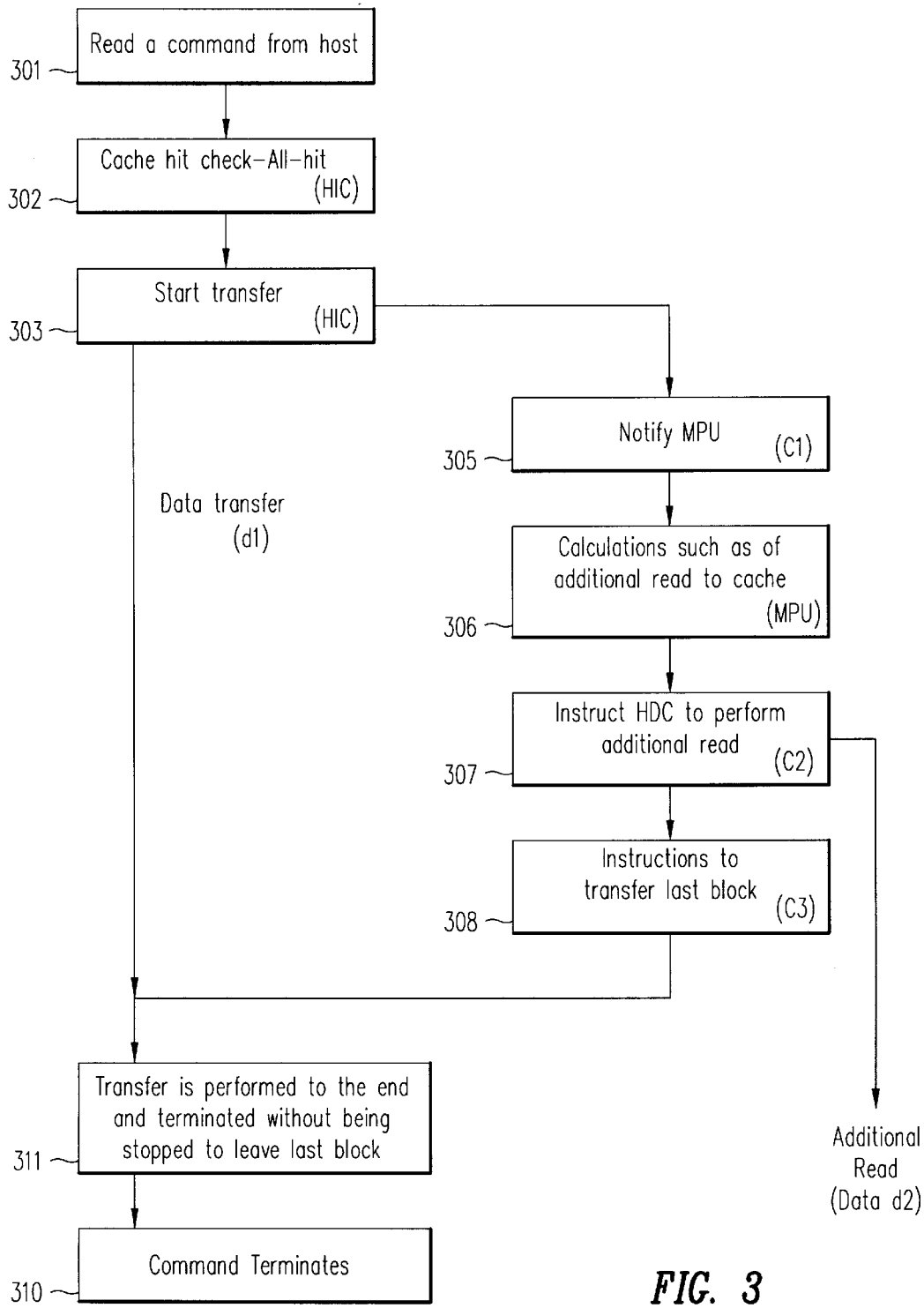
FIG. 3 is a timing flowchart illustrating the operation of the disk drive.

FIGS. 2 and 3 are flow charts showing the operation of the HDD. FIG. 2 shows the case in which the transfer of the last block is allowed by local MPU 16 after the transfer is stopped leaving the last block (corresponding to the above case 1), and FIG. 3 shows the case in which the transfer of the last block is allowed by the local MPU 16 before the transfer is stopped leaving the last block (corresponding to the above case 2).

Referring now to FIG. 2, if a read command is issued from the host (step 201), HIC 15 checks for a cache hit in step 202 to determine whether an all-hit condition has occurred from the read command, that is, whether all the required data is stored in cache memory 14.

For an all-hit condition, the process goes to step 203 where HIC 15 starts the data transfer as shown in step 203.

The HIC 15 immediately starts the data transfer without intervention from local MPU 16, as shown by arrow d1 in FIGS. 1 and 2. The data transfer is terminated prior to transferring the last block, and HIC 15 waits for transfer of the last block as shown in step 204.

Simultaneously with the start of the data transfer, HIC 15 notifies local MPU 16 of the command issuance and the all-hit condition (step 205). This notification is shown by control arrow C1 in FIGS. 1 and 2.

Upon receipt of the notification, local MPU 16 performs the processing such as the calculation of an additional read from the medium in step 206, as needed, and instructs HDC 13 to perform an additional read in step 207. This control is shown by control arrow C2 in FIG. 1. The HDC 13 performs an additional read from the medium and transfers the additionally data read to cache memory 14, as shown by arrow d2 in FIG. 1.

In step 208, local MPU 16 is responsible for terminating the control of the additional read. Once the control of the additional read is terminated, local MPU 16 issues a command permitting the transfer of the last block to HIC 15. This control is shown by C3 in FIGS. 1 and 2.

If the transfer is permitted, HIC 15 resumes the transfer in step 209, and transfers the last block as shown by arrow d3 in FIGS. 1 and 2. This terminates the command (step 210).

On the other hand, the flowchart of FIG. 3 shows the case in which the transfer of the last block is allowed by local MPU 16 before the transfer is ended.

According to FIG. 3, when a read command is issued from the host (step 301), HIC 15 performs a cache hit check in step 302 to determine whether an all-hit condition has occurred from the read command. When an all-hit condition occurs, the process advances to step 303 where HIC 15 starts the data transfer.

In this case, HIC 15 immediately starts and continues the data transfer without the intervention of local MPU 16, as shown by arrow d1 in FIGS. 1 and 3. The HIC 15 executes the transfer without stopping the transfer to leave the last block in step 311 and terminates the command (Step 310).

Simultaneously with the start of the data transfer in step 303, HIC 15 notifies local MPU 16 of the command issuance and the all-hit condition in step 305. This control is shown by arrow C1 in FIGS. 1 and 3.

Upon receipt of the notification, local MPU 16 performs the processing such as the calculation of an additional read from the medium in step 306, as needed, and instructs HDC 13 to perform an additional read in step 307. This control is shown by arrow C2 in FIGS. 1 and 3. The HDC 13 performs an additional read from the medium as shown by arrow C2, and stores the additionally read data in cache memory 14, as shown by arrow d2 in FIGS. 1 and 3.

In step 308, local MPU 16 determines the termination of the control of the additional read, and if the control of the additional read is terminated, it determines that the preparation of the command termination is already made, and issues a command permitting the transfer of the last block to HIC 15. This control is shown by arrow C3 in FIGS. 1 and 3. Because the additional read processing has been completed HIC 15 receives notification that it is allowed to transfer the last block before stopping the transfer to leave the last block, as described above. HIC 15 executes the entire transfer without stopping the transfer to leave the last block in step 311, terminating the command (step 310).

As described above, when an all-hit condition occurs from the read command, the data transfer is started by HIC 15 so as to leave the last one block. The local MPU 16 is informed of this, and performs the control of an additional read while HIC 15 is transferring data. The transfer is paused if the notification of the termination of the control of the additional read is not received before the last block (corresponding to the timing flow of FIG. 2), otherwise the last block is also transferred without stopping the transfer (corresponding to the timing flow of FIG. 3).

Accordingly, by allowing the local MPU to intervene at least once before completing a read command and an additional read from the medium can be performed as needed while minimizing the command overheard. Additionally, the maximum amount of data can be transferred by the read command without intervention from the local MPU.

As described above, if a read command is issued, and the required data is stored in the cache memory so that all the data transfer can be performed without the intervention of the local MPU 16, HIC 15 transfers data except the last block and waits for intervention from local MPU 16. The transfer of the last block is allowed once the preparation of the command termination is completed. If a plurality of blocks of data to be transferred are remaining when local MPU 16 allows HIC 15 to transfer the last block, HIC 15 executes all the data transfers without stopping the data transfer before the last one block and completes the command. Thus, while minimizing the command overhead, an additional read from the medium can be performed as needed, in order to increase the total performance.

For one embodiment, a sequential read of 4 MB with 8 blocks per command is issued. The simulation of the results was based on the following conditions.

Cache memory size: 128 KB (256 blocks)

Average read time from medium: 5.5 msec

Overhead of microcode for all-hit: 100 $\mu$sec

Overhead before data transfer for hardware: 0 $\mu$sec

Command interval: 0 $\mu$sec

Data transfer speed: PIO mode 4 of IDE (32 $\mu$sec/1 block)

Assuming the above condition, the transfer time per eight blocks is 32 $\mu$sec×8 blocks=256 $\mu$sec.

For a HDD using a conventional method, if a sequential read is issued from a cache memory full condition, (assuming that data for 32 times can be retained under the cache memory full condition), the following results are obtained:

(1) 438 msec is taken if all the processing is performed by hardware, and (2) 365 msec is taken if all the processing is intervened by the local MPU.

On the other hand, 262 msec is taken for the HDD employing this embodiment of the present invention, and accordingly the speed is largely increased as compared with the conventional method. That is, for the above (1), the average read time for additional reading from the medium (5.5 msec×32) is eliminated, and for the above (2), the execution time of the local MPU for each all-hit (100 $\mu$sec×32) is eliminated. Thus, the total performance can be increased by 30 to 40%.

Although one embodiment of the present invention has been described with respect to HDD 10, the present invention may be extended to various other disk drive embodiments as long as the disk drive device includes a cache memory. For instance, it may be used with an external storage device other than the HDD, such as a magneto-optic disk, and desirable results similar to the above described embodiment can be obtained.

Furthermore, in this embodiment, the HIC transfers data so as to leave the last one block, but any type of intervention may be used, provided that the transfer is intervened by the control by the microprocessor at least once before the read command is completed. Additionally, data is transferred so as to leave the last block, but, not being limited to one block, the data transfer may be made so as to leave a predetermined number of blocks.

While the preferred embodiments of the present invention have been illustrated in detail, it should be apparent that modifications and adaptations to those embodiments may occur to one skilled in the art without departing from the scope of the present invention as set forth in the following claims.

what is claimed is:

1. A method of controlling a read operation in a disk drive, comprising the steps of:

(a) receiving a read command;

(b) determining whether all data blocks requested by said read command are stored in a cache memory;

(c) if it is determined that all of said data blocks are stored in said cache memory, notifying a local microprocessor of the receipt of said read command and the all-hit status;

(d) transferring all of said data blocks except for at least a last one of said data blocks from said cache memory to an external host without any intervention from said local microprocessor; and (e) transferring said at least said last one of said data blocks from said cache memory to said external host upon an instruction from said local microprocessor.

2. The method of claim 1, wherein said local microprocessor provides said instruction prior to the completion of step (d).

3. The method of claim 1, wherein said local microprocessor provides said instruction after the completion of step (d).

4. The method of claim 1, further comprising, prior to step (d) the step of:

(f) transferring additional data from a disk to said cache memory under the control of a hard disk controller and the local microprocessor.

5. A disk drive, comprising:

a rotatable disk;

a head positioned to perform read operations;

a local microprocessor;

a cache memory;

a hard disk controller coupled to said cache memory and said local microprocessor, said hard disk controller configured to transfer read data from said disk to said cache memory in response to a command from said local microprocessor; and a host interface processor coupled to said cache memory and said local microprocessor, said interface processor configured to receive a read command from an external host and to transfer all of the data blocks requested by said read command from said cache memory to said external host under an all hit condition, wherein at least a last one of said data blocks stored in said cache memory is not transferred until an instruction is received from said local microprocessor.

* * * * *